US007317452B2

(12) United States Patent
Myers

(10) Patent No.: US 7,317,452 B2
(45) Date of Patent: Jan. 8, 2008

(54) DIGITAL VIDEO TRANSMISSION MODE FOR A STANDARD ANALOG VIDEO INTERFACE

(75) Inventor: Robert L. Myers, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 10/698,925

(22) Filed: Oct. 31, 2003

(65) Prior Publication Data

US 2005/0093849 A1 May 5, 2005

(51) Int. Cl.
*G06F 3/038* (2006.01)
*G09G 5/00* (2006.01)

(52) U.S. Cl. ........................ 345/204; 345/88; 345/205; 345/206; 345/600

(58) Field of Classification Search .................. 345/88, 345/600, 204–206
See application file for complete search history.

(56) References Cited

U.S. PATENT DOCUMENTS 5,534,883 A * 7/1996 Koh ............................ 345/98
6,175,351 B1 * 1/2001 Matsuura et al. ............. 345/98
6,614,424 B1 * 9/2003 Kim et al. .................. 345/213

* cited by examiner

*Primary Examiner*—Amr A. Awad
*Assistant Examiner*—Michael Pervan

(57) ABSTRACT

Embodiments of the present invention include a method for transmitting digital video over an analog interface. The method comprising accessing digital video data having a number of bits per color per pixel and encoding the digital video data such that analog compatibility standards are preserved and the bits per color per pixel are encoded to an amplitude level. The method further includes transmitting the encoded digital video data over an analog interface.

24 Claims, 6 Drawing Sheets

DIGITAL VIDEO TRANSMISSION MODE FOR A STANDARD ANALOG VIDEO INTERFACE

CROSS REFERENCE TO RELATED APPLICATIONS

The present application is related to U.S. Patent Publication No. 20040001057 entitled "System and Method For An Enhanced Analog Video Interface" by Bob Myers, filed Jan. 1, 2004 is incorporated herein by reference as background material.

Additionally, the present invention is related to U.S. Patent Publication No. 20040001053 entitled "System and Method For Providing A Reference Video Signal" by Bob Myers, filed Jan. 1, 2004 is incorporated herein by reference as background material.

FIELD OF THE INVENTION

The present invention relates generally to transmitting digital video data over a standard analog video interface.

BACKGROUND

The current analog video interface used in the personal computer (PC) industry is commonly referred to as the VGA interface and has served for many years in the PC industry. The VGA interface continues to be the de facto standard video connection and is still used with the vast majority of displays and graphics hardware sold today. However, this long used interface suffers from several shortcomings, especially in its suitability for use with digital video transmission and fixed-format displays, such as liquid crystal displays (LCDs).

Newer and more capable interfaces have been introduced in an attempt to address the shortcomings of the VGA interface. Two of the more widely recognized standards are the Plug & Display (P&D) standard from the Video Electronics Standards Association (VESA), and the Digital Visual Interface (DVI) standard from the Digital Display Working Group (DDWG). Both the P&D and DVI standards have offered a generally digital interface for use with non-CRT displays, under the belief that such displays are more suited to a digital form of video transmission.

These standards have seen very limited acceptance, primarily due to the lack of compatibility with the earlier VGA standard. Unfortunately, this means that display systems will generally continue to use the VGA interface despite its limitations.

SUMMARY OF THE INVENTION

Embodiments of the present invention include a method for transmitting digital video over an analog interface. The method comprising accessing digital video data having a number of bits per color per pixel and encoding the digital video data such that analog compatibility standards are preserved and the bits per color per pixel are encoded to an amplitude level. The method further includes transmitting the encoded digital video data over an analog interface.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION

Figure 1:
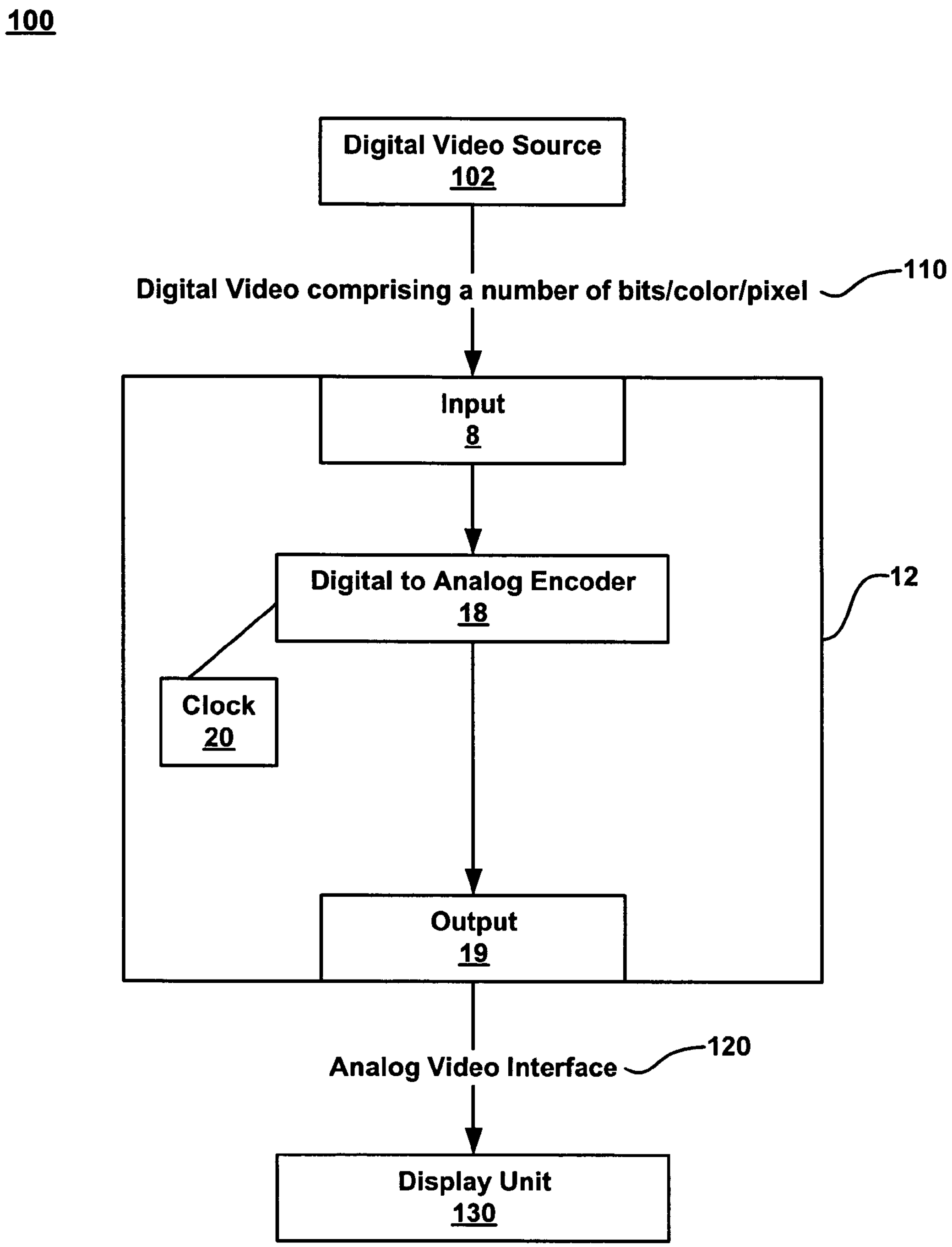
FIG. 1 is a block diagram of an exemplary system for transmitting digital video data over an analog video interface in accordance with embodiments of the present invention.

Reference will now be made in detail to embodiments of the present invention, a digital video transmission for a standard analog video interface, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

A recent trend in the computer world has been the introduction of video interface standards employing a digital transmission system. This trend is based on the belief that non-CRT display devices (such as LCDs) are "inherently digital" and are best served by a digital interface. However, this belief is not necessarily true. The majority of the popular non-CRT display technologies are distinguished from CRT displays primarily because they are fixed-format display devices, not because they require digital input. This means that the display in such technologies provides a fixed number of physical picture elements or pixels through which the image information can be displayed to the user. These picture elements are generally arranged in horizontal rows and vertical columns.

A fixed-format arrangement does not necessarily define whether this display type is best served by digital or analog encoding of the image information. One thing that is valuable to a fixed-format display is the accurate sampling of the incoming image information. Accurate sampling allows each sample of the image data to be assigned unambiguously to the proper physical pixel of the display device.

The patent applications incorporated herein as background material describe systems which permit easier use of standard analog video signals with fixed format display devices such as LCDs, including the transmission of sampling clock reference, clear identification of the start and stop of the active video period, and a system for automatically correcting for amplitude errors (e.g., cable losses) in the analog video signal. This system is referred to herein as the New Analog Video Interface (NAVI) interface.

The present invention can be used in conjunction with the NAVI interface to provide an exemplary transmission system and method for transmitting digital video data over an analog video interface (e.g., a VGA interface). Embodiments of the present invention include a method for transmitting digital video over an analog interface. The method comprising accessing digital video data having a number of bits per color per pixel and encoding the digital video data such that analog compatibility standards are preserved and the bits per color per pixel are encoded to an amplitude level. The method further includes transmitting the encoded digital video data over an analog interface.

Embodiments of the present invention further include a system for transmitting digital video data over an analog video interface. The system comprising an input for receiving digital video data comprising a number of bits per color per pixel and a digital to analog video encoder coupled to the input for encoding the digital video data such that analog compatibility standards are preserved and the bits per color per pixel are encoded to an amplitude level. The system further includes an output coupled to the digital to analog video encoder configured to communicatively couple to an analog video transmission line for transmitting the encoded digital video data.

Additionally, in other embodiments of the invention, the digital data representing one pixel is divided into even and odd bits and transmitted in successive clock cycles of a symbol rate clock. By separating the data into two successive packets, the chances of loosing a significant bit in the transmission are reduced. To further reduce the chances of error in transmission, the digital video data is encoded to one of a plurality of distinguishable amplitude levels. In one embodiment of the invention, there are eight available amplitude levels that pixel bits can be encoded to. In this embodiment, a plurality of bits (e.g., three bits per color per pixel) are encoded to one of eight amplitude levels. In one embodiment of the invention, the available amplitude levels range between 0.0 volts and 0.7 volts. In this embodiment, the available amplitude levels are 0.1 volts apart, making each of the levels very distinguishable. By making the difference in levels distinguishable, errors in transmission (e.g., system noise) can be substantially reduced.

FIG. 1 is an illustration of an exemplary system 100 for transmitting digital video data 110 over an analog video interface 120 in accordance with embodiments of the present invention. System 100 includes a digital video source 102 for providing digital video data comprising a number of bits per color per pixel 110. In one embodiment of the invention, six bits per color per pixel are accessed, but any even number of bits per color per pixel can be used. The digital video data 110 is accessed by computer system 12 by input device 8. The digital video data 110 is then encoded by a digital to analog converter 18 where the digital video data is encoded to amplitude levels and transmitted via output 19. The encoded digital video data is transmitted over an analog video interface 120 to a display unit 130. Display unit can be any display unit and in one embodiment of the invention, display unit is a fixed-format display unit (e.g., a LCD display). In one embodiment of the invention, the analog video interface is a NAVI interface. In one embodiment of the invention, the output 19 is a standard VGA interface.

Figure 2:
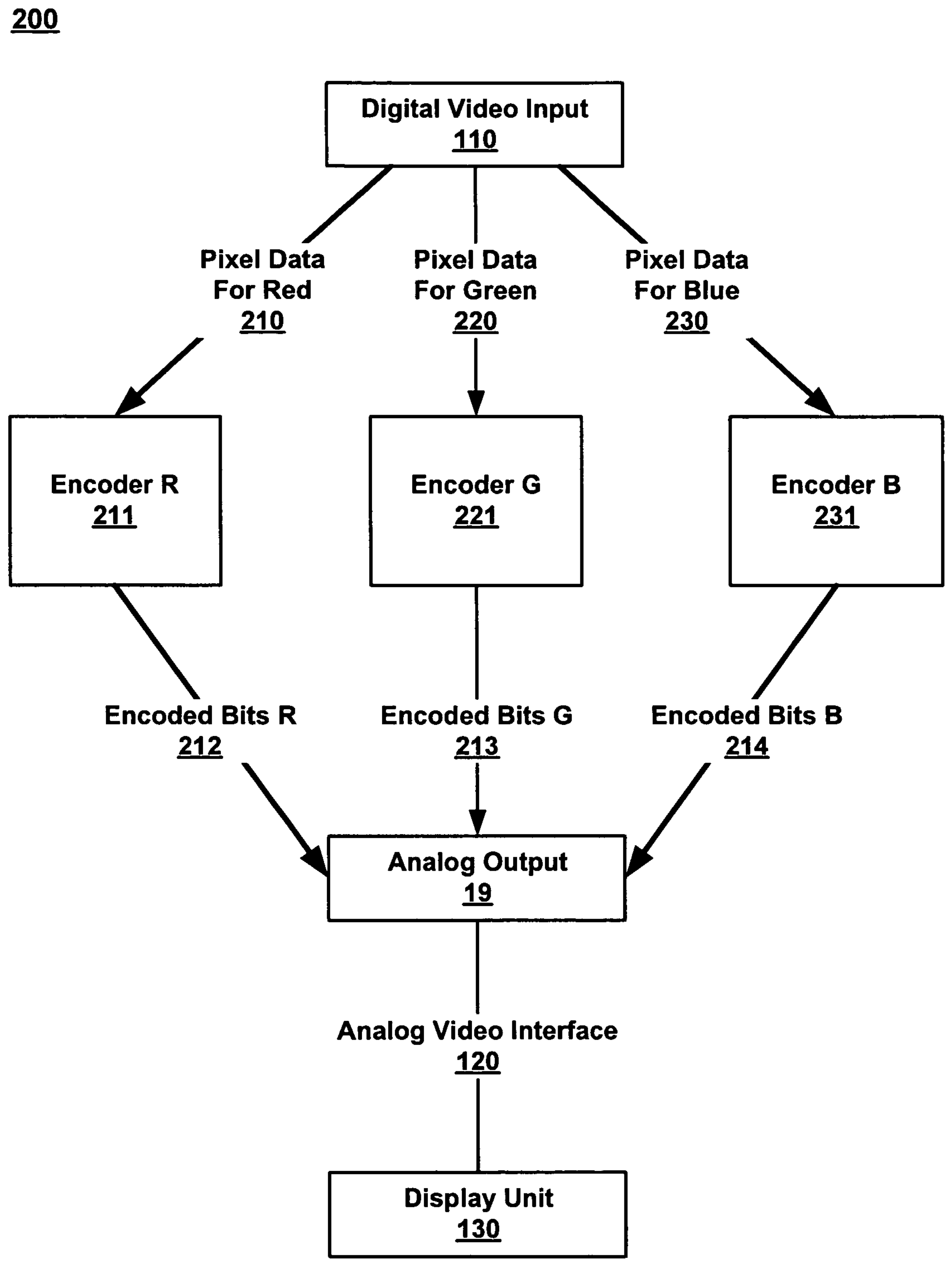
FIG. 2 is a block diagram of an exemplary system for encoding separate color channels of a digital video data stream so that it can be transmitted over an analog video interface in accordance with embodiments of the present invention.

FIG. 2 is a block diagram of an exemplary system for encoding separate color channels of a digital video data stream so that it can be transmitted over an analog video interface in accordance with embodiments of the present invention. In one embodiment of the invention, the digital video data 110 is divided by color into three separate channels. Channel 210 comprises the pixel data for red, channel 220 comprises pixel data for green and channel 230 comprises pixel data for blue. The separate channels are encoded by separate encoders for each channel. It is appreciated that the encoders for each channel could be coupled together and reside in one encoder unit. Encoder R 211 encodes the red pixel data 210, encoder G 221 encoded the green pixel data 220 and encoder B 231 encodes blue pixel data 230. In one embodiment of the invention, the pixel data is represented by six bits per color per pixel. In this embodiment of the invention, the six bits are separated into even and odd bits. Then a first set of three bits is encoded as one of eight amplitude levels and sent via analog output 19 to analog video interface 120 and display unit 130 on a single clock cycle. Then a second set of three bits are encoded to one of eight available amplitude levels and transmitted on a subsequent clock cycle.

Figure 3:
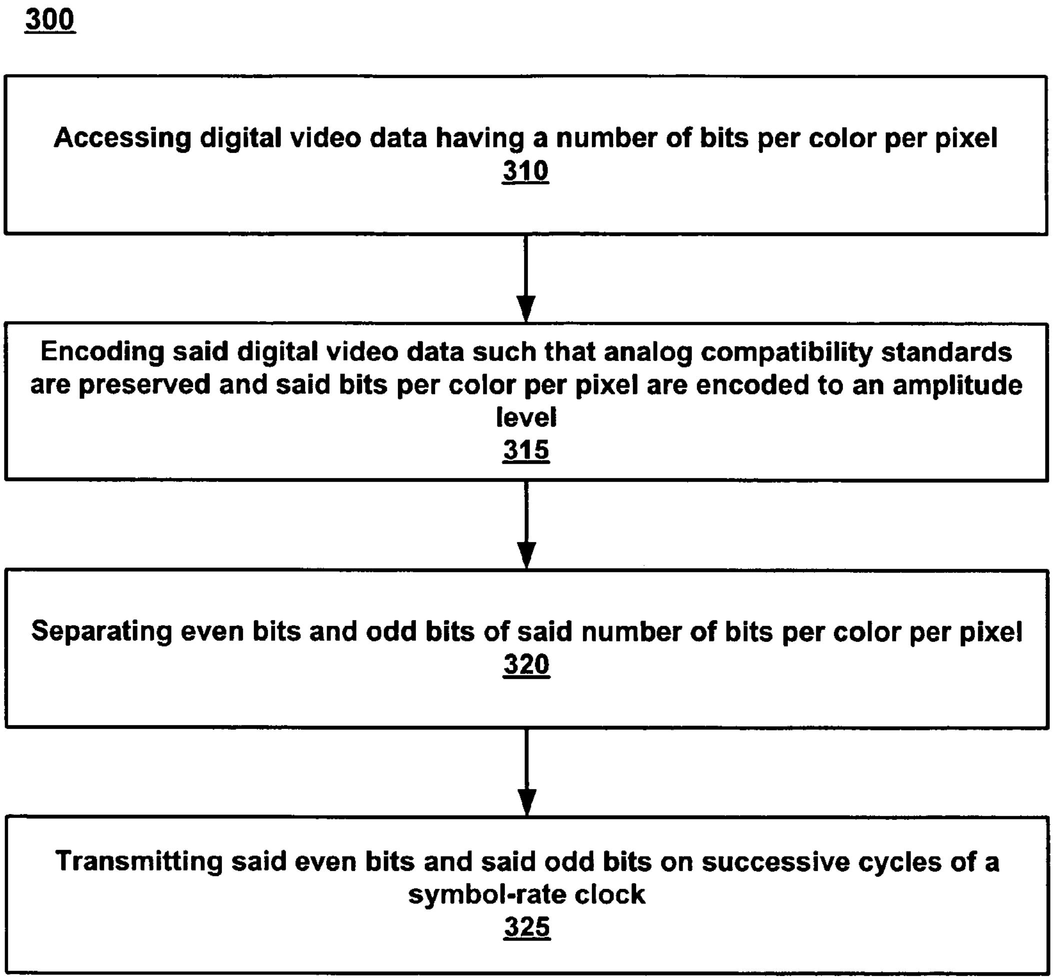
FIG. 3 is a data flow diagram of an exemplary process for transmitting digital video data over an analog video interface in accordance with embodiments of the present invention.

FIG. 3 is a data flow diagram of an exemplary process for transmitting digital video data over an analog video interface in accordance with embodiments of the present invention. Process 300 includes step 310 comprising accessing digital video data having a number of bits per color per pixel. In one embodiment of the invention, the number of bits per color per pixel is six. In another embodiment of the present invention, the number of bits per color per pixel is eight.

The next step 315 is encoding the digital video data such that analog compatibility standards are preserved and that the bits per color per pixel are encoded to an amplitude level. In one embodiment of the invention VGA standards are preserved and six bits per color per pixel are encoded. In this embodiment, even and odd bits are separated in step 320 into two sets of symbols, represented by three bits each and are encoded to one amplitude level ranging between 0.0 volts and 0.7 volts.

In step 325, the encoded symbol is transmitted over an analog interface in a single clock cycle. The second symbol is transmitted in a successive clock cycle. The two transmitted symbols (encoded digital video data) represent one color for one pixel. The encoded data from three channels can be combined as the data for one pixel (from two successive clock cycles).

Figure 4:
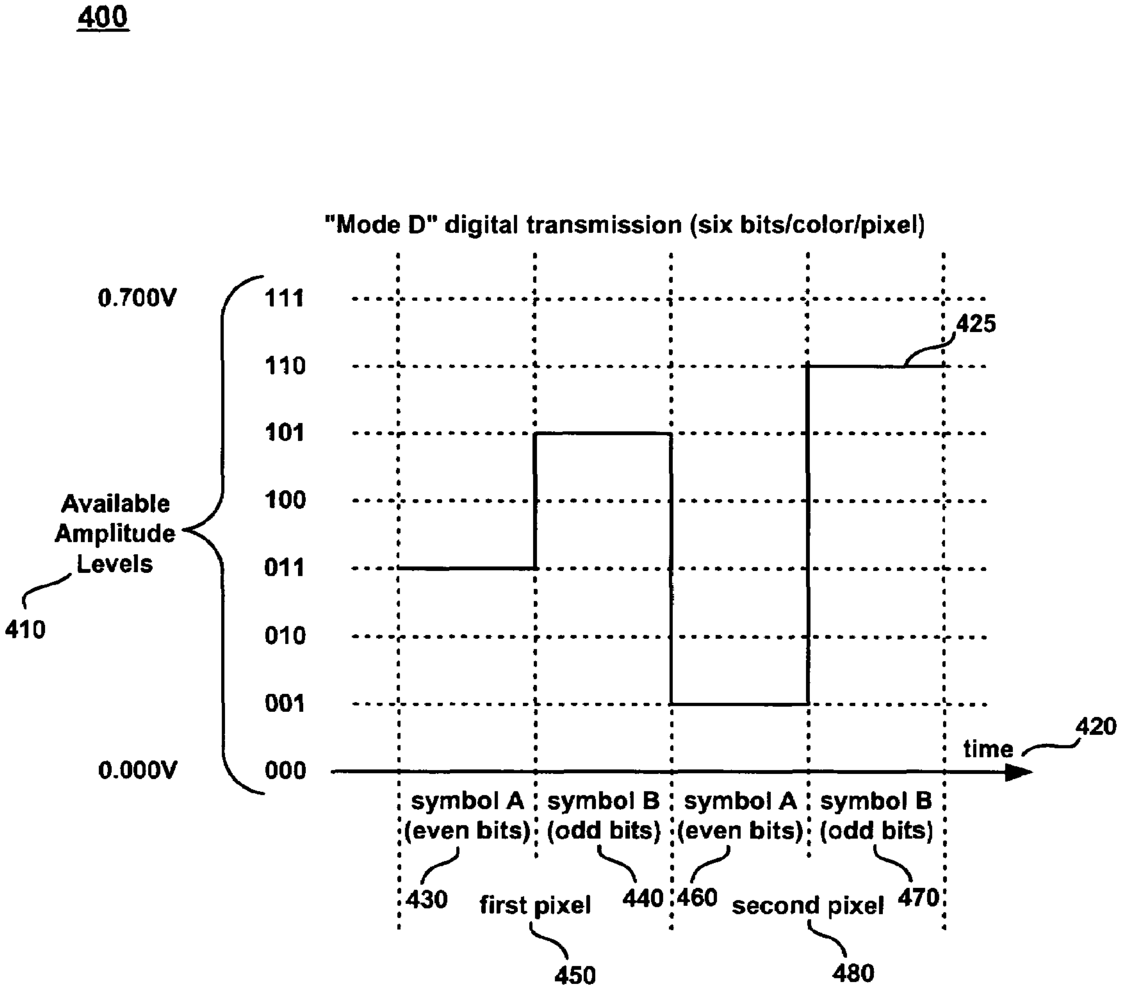
FIG. 4 is an illustration of two successive pixels of an exemplary six bit per color mode D transmission in accordance with embodiments of the present invention.

FIG. 4 is an illustration of two successive pixels of an exemplary six bit per color mode D transmission in accordance with embodiments of the present invention. FIG. 4 illustrates a transmission of encoded digital video data that can be transmitted over an analog interface. The mode D transmission 425 of the present invention transmits, in one embodiment, a signal that ranges between 0.0 volts and 0.7 volts. The signal is sent as symbols that are at one of the eight available levels 410. The first pixel 450 is represented by symbol A 430 (even bits) and symbol B 440 (odd bits). Symbol A 430 and symbol B 440 are transmitted on subsequent clock cycles. The second pixel 480 is represented by symbol A 460 and symbol B 470. Symbol A 460 and symbol B 470 are transmitted on subsequent clock cycles after the first pixel 450.

In one embodiment of the invention, six bits are accessed, and separated into even and odd bits. The two sets of three bits each are encoded to one of eight available amplitude levels ranging from 0.0 volts to 0.7 volts. The range of voltage could be any range such that the distinct amplitude levels can be accurately distinguished when decoded on the display unit. In this embodiment of the invention, six bits per pixel per channel (e.g., color) may be transmitted as two successive symbols carrying three bits (encoded as eight possible levels) each. Each level in the resulting successive symbols differs from its neighbor by a tenth of a volt, which is readily distinguishable by an analog to digital converter (decoder) typically used in display units. In one embodiment of the invention, to avoid possible noise susceptibility in which a relatively high order bit (e.g., bit three out of bits 0-5 in a six bit system) would be encoded as a least significant bit (LSB) change in the output signal. The even and odd bits of the six bit pixel information can be separated and distributed across the two packets (e.g., symbols) transmitted. This ensures that the lowest order bits (bits 0 and 1) remain the ones most susceptible to error due to noise.

In an alternative embodiment of the present invention, eight bits per color per pixel would be transmitted as one of sixteen possible levels of the video signal, with even and odd bits remaining separated across two symbols as before. This reduces the noise margin for the LSB information by approximately 50 mV between adjacent levels. The LSB information can still be readily recoverable in most situations.

Figure 5:
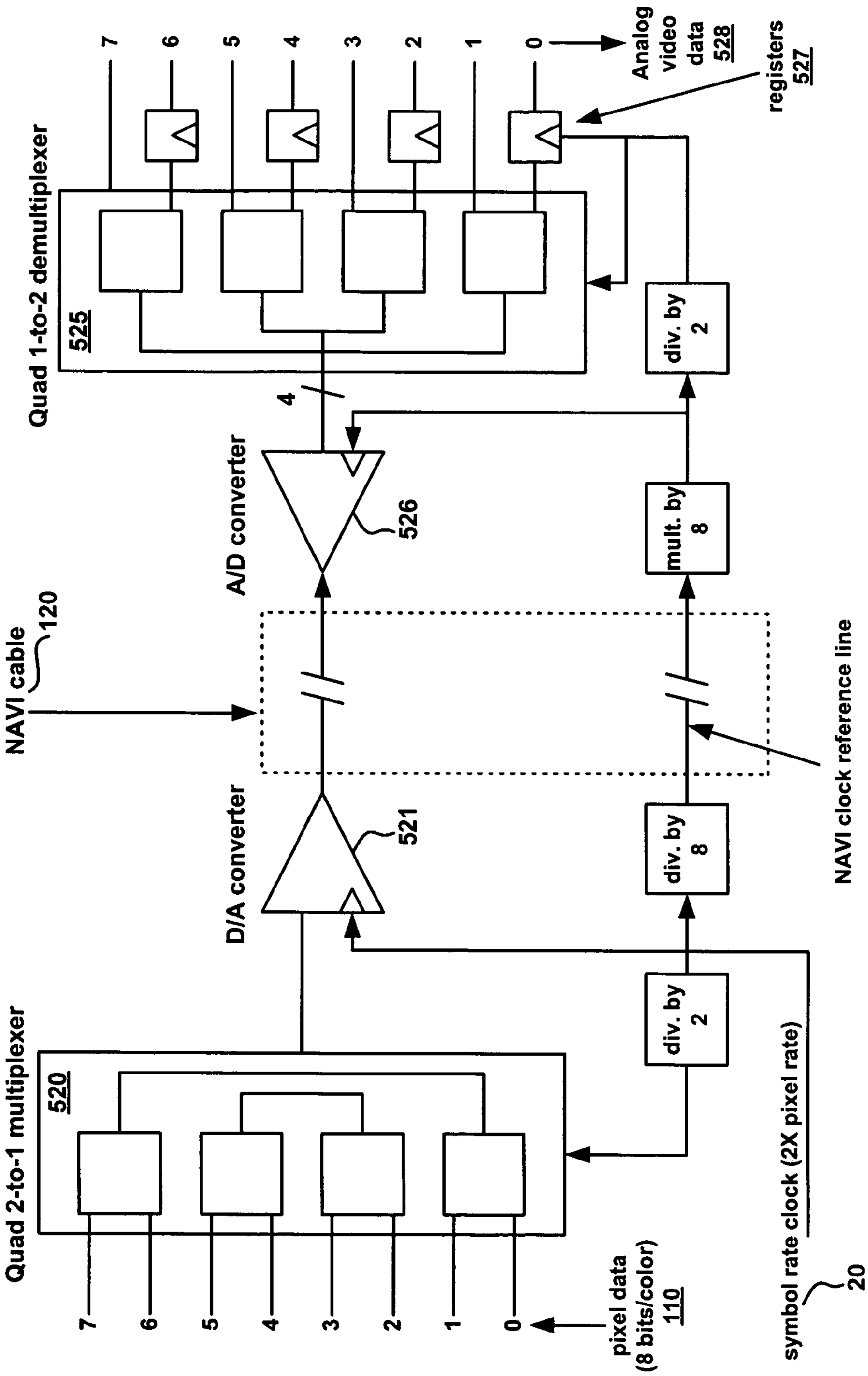
FIG. 5 is an exemplary system for implementing mode D transmission in accordance with embodiments of the present invention.

FIG. 5 is an illustration of an exemplary system for transmitting digital video data over an analog video interface in accordance with embodiments of the present invention. The system in FIG. 5 illustrates one color (channel) of an eight bit per color embodiment of the present invention. In this embodiment, the eight bits of information 110 are separated into even and odd bit packets or symbols by a quad two-to-one-multiplexer 520. The separated bits are then encoded by the digital to analog converter 521. The symbols are then transmitted on successive clock cycles of a symbol rate clock (e.g., two times pixel rate clock). The data capacity of the present invention depends on the maximum symbol or pixel rate permissible on the physical interface (e.g., interface 120). For example, if a 500 MHz maximum pixel rate is used, given an appropriate connector, would require a 62.5 MHz reference clock signal. Embodiments of the present invention has a data capacity that exceeds the 300-400 MHz pixel clock range of current graphics systems.

In one embodiment of the invention, the encoded digital data is transmitted over a NAVI cable. The NAVI cable is coupled to a video display unit where the eight bit pixel data 110 is restored by first latching the even bits (which were transmitted first) and then recovering the odd bits. An analog to digital decoder 526 decoded the encoded digital data and a quad one to two demultiplexer 525 is used to pair up the even and odd bits. In one embodiment of the invention, a look-up table function is used between the multiplexer 520 and digital to analog converter 521 on the source end to properly map the four bits per symbol to the proper output signal levels, depending on the digital to analog converter used. Likewise, a look-up table function can be used between the demultiplexer 525 and analog to digital converter 526 on the display end to properly map the output signal levels to the appropriate four bits per symbol, depending on the analog to digital converter used.

Figure 6:
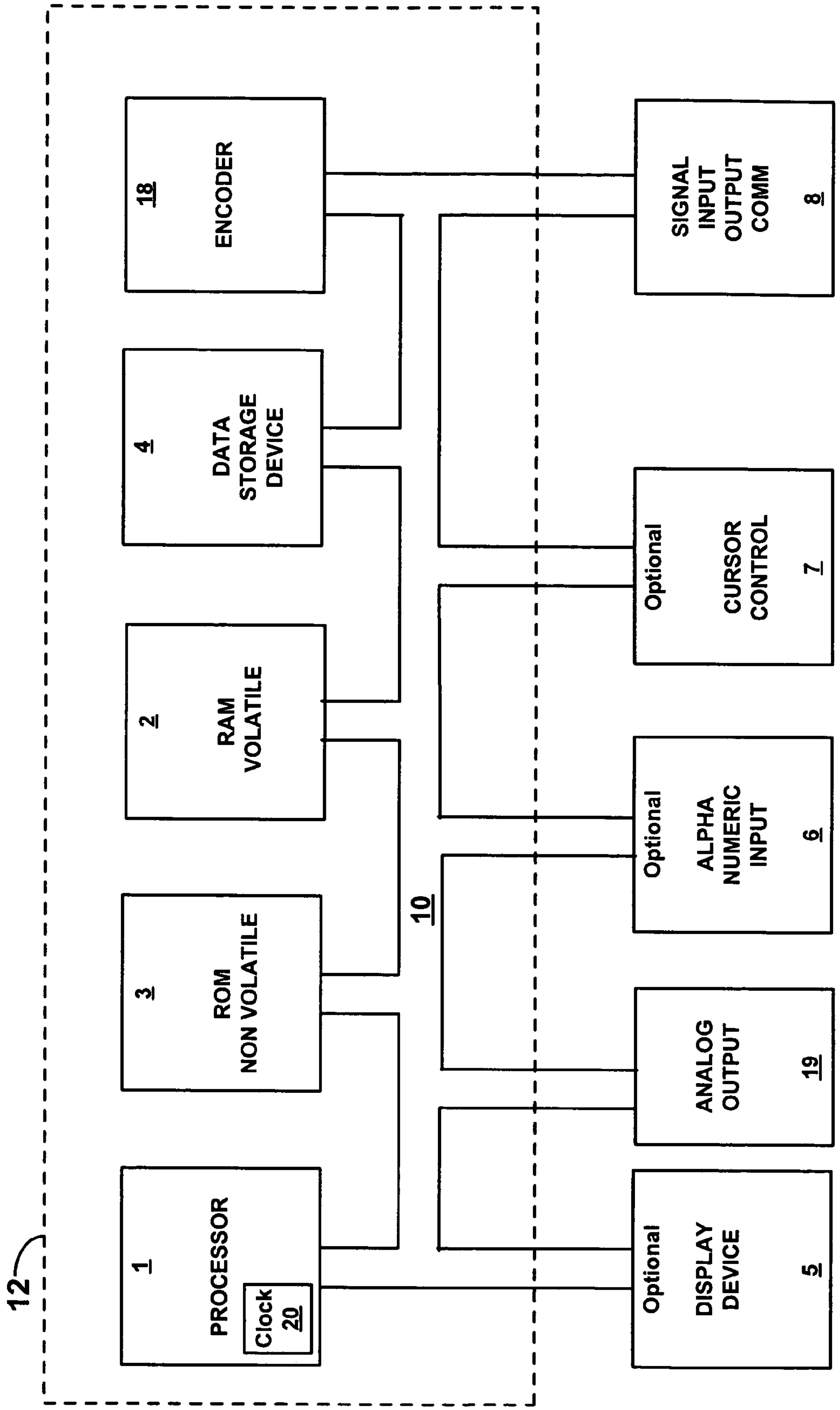
FIG. 6 is a block diagram of an exemplary computer system in accordance with embodiments of the present invention.

Referring now to FIG. 6, a block diagram of exemplary computer system 12 is shown. It is appreciated that computer system 12 of FIG. 6 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer or an embedded computer system such as a mobile telephone or pager system.

Computer system 12 includes an address/data bus 10 for communicating information, a central processor 1 coupled with bus 10 for processing information and instructions, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions. In one embodiment, processor 1 comprises a clock 20.

Also included in computer system 12 of FIG. 6 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port, a USB port or any other communication port or interface. Communication interface 8 can also include number of wireless communication mechanisms such as infrared or a Bluetooth protocol.

Computer system 12 also comprises an analog output 19 configured to communicatively couple to an analog video interface, for example, a VGA output. Computer system 12 also comprises a power management encoder 18 for encoding digital video data to be transmitted over an analog interface.

Furthermore, it is appreciated that computer system 12 can comprise multiple encoders for encoding a plurality of video signals. In one embodiment of the invention, a separate encoder is used for three color channels of digital video data (e.g., red channel, green channel and blue channel).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for transmitting digital video over an analog interface comprising:

accessing digital video data having a number of bits per color per pixel;

encoding said digital video data such that analog compatibility standards are preserved and said bits per color per pixel are encoded to an amplitude level;

transmitting said encoded digital video data over an analog interface;

separating even bits and odd bits of said number of bits per color per pixel; and transmitting said even bits and said odd bits over a New Analog Video Interface (NAVI).

2. The method as recited in claim 1 further comprising: encoding six bits per color per pixel of said digital video data.

3. The method as recited in claim 1 further comprising: encoding a plurality of bits of said digital video data to one of eight available amplitude levels.

4. The method as recited in claim 3 further comprising: encoding said plurality of bits of said digital video data to an amplitude level between 0.0 volts and 0.7 volts.

5. The method as recited in claim 1 further comprising: encoding said digital video data such that each pixel is represented by three bits wherein each of said three bits are encoded to one of eight available levels of amplitude.

6. The method as recited in claim 1 further comprising: transmitting said even bits and said odd bits on successive cycles of a symbol-rate clock.

7. The method as recited in claim 1 further comprising: decoding said amplitude level to a brightness level compatible with a fixed-format video display.

8. A system for transmitting digital video data over an analog video interface comprising:

an input for receiving digital video data comprising a number of bits per color per pixel;

a digital to analog video encoder coupled to said input for encoding said digital video data such that analog compatibility standards are preserved and said bits per color per pixel are encoded to an amplitude level; and an output coupled to said digital to analog video encoder configured to communicatively couple to an analog video transmission line for transmitting said encoded digital video data, wherein said output is configured to communicatively couple to a New Analog Video Interface cable.

9. The system as recited in claim 8 wherein said output is also configured to communicatively couple to a VGA adapter.

10. The system as recited in claim 8 wherein said digital to analog video encoder encodes said bits per color per pixel to one of eight distinguishable amplitude levels.

11. The system as recited in claim 8 wherein said digital to analog video encoder encodes three bits per said color per said pixel and wherein said three bits are encoded to an amplitude level between 0.0 volts and 0.7 volts.

12. The system as recited in claim 8 further comprising: a multiplexer coupled to said digital to analog video encoder for separating said bits per color per pixel into even and odd bits.

13. The system as recited in claim 12 further comprising: a symbol-rate clock coupled to said output configured such that said even and said odd bits can be transmitted in successive clock cycle of said symbol-rate clock.

14. A method for encoding digital video data to an analog compatible format comprising:

accessing a plurality of bits per color per pixel of digital video data;

encoding said bits per color per pixel to one of a plurality of available amplitude levels;

separating said plurality of bits per color per pixel into even bits and odd bits;

transmitting said even bits and said odd bits in successive clock cycles of a symbol rate; and transmitting said even bits and said odd bits over a New Analog Video Interface (NAVI).

15. The method as recited in claim 14 further comprising: restricting said available amplitude levels to eight levels.

16. The method as recited in claim 15 further comprising: encoding a first set of bits of said bits per color per pixel to one of said eight available amplitude levels and transmitting said encoded first set of bits of said bits per color per pixel.

17. The method as recited in claim 16 further comprising: encoding a second set of bits of said bits per color per pixel to one of said eight available amplitude levels and transmitting said encoded second set of bits of said bits per color per pixel.

18. The method as recited in claim 14 further comprising: decoding said amplitude level to a brightness level compatible with a fixed-format video display.

19. The method as recited in claim 14 further comprising: encoding said bits of said bits per color per pixel of said digital video data to an amplitude level between 0.0 volts and 0.7 volts.

20. An encoder for encoding digital video data to be transmitted over an analog interface comprising:

an input for receiving digital video data comprising a number of bits per color per pixel;

an encoder module coupled to said input for encoding said digital video data such that analog compatibility standards are preserved and said bits per color per pixel are encoded to an amplitude level; and an output coupled to said encoder module configured to communicatively couple to an analog video transmission line for transmitting said encoded digital video data, wherein said output is configured to communicatively couple to a New Analog Video Interface cable.

21. The encoder as recited in claim 20 wherein said output is also configured to communicatively couple to a VGA adapter.

22. The encoder as recited in claim 20 wherein said encoder module encodes said bits per color per pixel to one of eight distinguishable amplitude levels.

23. The encoder as recited in claim 20 wherein said encoder module encodes three bits per said color per said pixel and wherein said three bits are encoded to an amplitude level between 0.0 volts and 0.7 volts.

24. The encoder as recited in claim 20 further comprising: a multiplexer coupled to said digital to encoder module for separating said bits per color per pixel into even and odd bits.

* * * * *

UNITED STATES PATENT AND TRADEMARK OFFICE

CERTIFICATE OF CORRECTION

PATENT NO. : 7,317,452 B2
APPLICATION NO. : 10/698925
DATED : January 8, 2008
INVENTOR(S) : Robert L. Myers It is certified that error appears in the above-identified patent and that said Letters Patent is hereby corrected as shown below:

In column 8, line 8, in Claim 14, after "rate" insert -- clock --.

Signed and Sealed this
Fourteenth Day of June, 2011

David J. Kappos
*Director of the United States Patent and Trademark Office*